United States Patent
Hampapuram et al.

(10) Patent No.: US 7,571,431 B2
(45) Date of Patent: Aug. 4, 2009

(54) PROCESSING MACRO INFORMATION AND DISPLAYING VIA GUI IN DIFFERENT TOOLS

(75) Inventors: Haripriyan Hampapuram, Bellevue, WA (US); Muthu Arun Kumar Jagannathan, Bellevue, WA (US); Eduardo Feu, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 482 days.

(21) Appl. No.: 10/426,121

(22) Filed: Apr. 29, 2003

(65) Prior Publication Data

US 2004/0221262 A1    Nov. 4, 2004

(51) Int. Cl.
*G06F 9/45* (2006.01)
(52) U.S. Cl. .................. 717/141; 717/113; 717/143
(58) Field of Classification Search .............. 717/113, 717/141, 143
See application file for complete search history.

(56) References Cited

U.S. PATENT DOCUMENTS

| | | | | |
|---|---|---|---|---|
| 4,553,205 A | * | 11/1985 | Porchia | 717/136 |
| 5,701,487 A | * | 12/1997 | Arbouzov | 717/124 |
| 5,842,204 A | | 11/1998 | Andrews et al. | |
| 5,946,488 A | * | 8/1999 | Tanguay et al. | 717/141 |
| 5,999,733 A | * | 12/1999 | Shamoto | 717/143 |
| 6,263,493 B1 | * | 7/2001 | Ehrman | 717/141 |
| 6,367,068 B1 | * | 4/2002 | Vaidyanathan et al. | 717/143 |
| 6,427,228 B1 | * | 7/2002 | Wigger | 717/100 |
| 6,925,635 B2 | * | 8/2005 | Garvey | 717/143 |
| 2003/0163801 A1 | * | 8/2003 | Thames et al. | 717/123 |

FOREIGN PATENT DOCUMENTS

| | | |
|---|---|---|
| JP | 62200426 | 9/1987 |
| JP | 63228239 | 9/1988 |

OTHER PUBLICATIONS

Kohlbecker, et al. "Macro-by-Example: Deriving Syntactic Transformations from their Specifications", 1987, ACM, p. 77-84.*
Shende, et al. "Portable Profiling and Tracing for Parallel, Scientific Applications using C++", 1998, ACM, p. 134-145.*

(Continued)

*Primary Examiner*—Li B Zhen
(74) *Attorney, Agent, or Firm*—Klarquist Sparkman, LLP

(57) ABSTRACT

Software development tools, such as a static analyzer, debugger or source browser, incorporates techniques to process macro expansions and provide display of macro expansion information, so as to facilitate program analysis and debugging during the development process. The tool processes macro expansions during a build of a programming project's source files, and collects and records the macro expansion information into an output file or database. The tool then utilizes the recorded information to provide a display of the macro expansions in a graphical user interface of the tool, such as for source browsing or viewing static analysis.

9 Claims, 4 Drawing Sheets

OTHER PUBLICATIONS

W. M. Waite, "A Language Independent Macro Processor", 1967, ACM, p. 433-440.*

Jagannathan, et al. "Flow-directed Inlining", 1996, ACM, p. 193-205.*

Compaq C++ Version 6.5 for Tru64 UNIX (Mar. 2002), available at http://nf.apac.edu.au/facilities/software/CXX/spdu.htm.

"Debugging with GDB," Ch. 9, Ninth Edition (Dec. 2001), for GDB Version 5.3. Copyright (C) 1988-2002 Free Software Foundation, Inc. Available at http://www.cs.odu.edu/~public/gdbdocs/gdb.html or http://developer.apple.com/documentation/DeveloperTools/gdb/gdb/gdb_10.html.

Lassila, "A macro expansion approach to embedded processor code generation," (1996), http://citeseer.ist.psu.edu/lassila96macro.html.

PolySpace Technologies, "PolySpace for C++: Do you want to reduce your coding and testing effort?", available at http://www.polyspace.com/docs/C++datasheet.pdf.

Weise and Crew, "Programmable Syntax Macros," *ACM SIGPLAN Notices* 28(6):156-165 (1993). Also available as: Weise and Crew, "Programmable Syntax Macros," *Microsoft Research Labratory* (1993), available via http://citeseer.ist.psu.edu/cache/papers/cs/629/ftp:zSzzSzftp.research.microsoft.comzSzpubzSzanalystszSzmacro.pdf/weise93programmable.pdf.

Aho et al., "Compilers: Principles, Techniques, and Tools," Addison-Wesley Publishing Company (1986) Title pages and pp. 4, 5, 16, and 17 (7 pages total).

\* cited by examiner

Macro Processing and Viewing Tool 780

Figure 2

```
struct MacroInfo
{
        // Macro definition details
        char macroName[100];
        char definition[1000];
        char defnFile[MAX_PATH+1];
        long defnLine;
        long formalCount;

// Macro expansion details
        char arguments[500];
        char expansion[1000];
        char expnFile[MAX_PATH+1];
        long expnLine;
        long expnColumn;
        long expnOrder;
} m_macroInfo;
```

```
1250   if (NULL == m_pPdbSH)
1251      throw SymError(LOP_SYM7_INTERNAL_ERROR, __LINE__, GetLastError());
``` macro 'NULL' expands to:0 — 400

| 1249 m_pPdbSH = new PdbSymbolHandler(m_NameTable); | |
|---|---|
| 1250 if (NULL == m_pPdbSH) | 510 |
| 1251    throw SymError(LOP_SYM7_INTERNAL_ERROR, __LINE__, GetLastError()); | macro 'NULL' expands to:0 |
| 1252 | |
| 1253 BOOL Success=m_pPdbSH->OpenExeAndPdb( ImgPath(), m_PdbPath.c_str() ); | |

Figure 6    600

| Line No. | Macro | Expands To: |
|---|---|---|
| 1250 | NULL | 0 |
| 1251 | __LINE__ | 1251 |
| 1251 | LOP_SYM7_INTERNAL_ERROR | (700+10) |
| 1256 | stderr | (&_iob[2]) |
| ... | ... | ... |

PROCESSING MACRO INFORMATION AND DISPLAYING VIA GUI IN DIFFERENT TOOLS

TECHNICAL FIELD

The invention relates generally to software development tools, and more particularly relates to tools for viewing, analyzing and/or debugging software program source code.

BACKGROUND

In programming languages, such as C, C++, and assembly language, among others, a macro is a name that defines a set of instructions that are substituted for the macro name wherever the name appears in a program (a process called macro expansion) when the program is compiled or assembled. Macros are similar to functions in that they can take arguments and in that they can represent lengthier sets of instructions. Unlike functions, macros are replaced by the actual instructions they represent when the program is prepared for execution; function instructions are copied into a program only once. (See, *Microsoft Computer Dictionary, Fourth Edition,* page 278, Microsoft Press (1999).) In C and C++ programming languages, for example, macros can be defined in "#define" preprocessor directives.

A statement in source code that defines a macro is herein referred to as a macro definition. A source code statement that uses or contains a macro is referred to as a macro statement. The instructions resulting from the process of macro expansion of a macro is referred to herein as an expanded macro or also the macro's expansion.

The process of macro expansion conventionally is performed during or as a preprocess of compiling or assembling the program. The developer prepares the source file or files for the program, and inputs the source files to the compiler or assembler. The compiler or assembler produces object files, in which any macros are fully expanded and translated into object code form. Apart from the final object file or files resulting from the compilation, information as to the macro expansion of any individual macro is not kept. Accordingly, it can be very difficult for the developer to determine which set of object code instructions in the object code files were produced by macro expansion and compilation/assembly of respective macros in the source files.

Moreover, macros often are defined in terms of other macros. The macro expansion process therefore can often involve a nested sequence of macro expansions. In commercially significant software projects, macros are not uncommonly defined with 15 to 20 levels of nesting. This creates further difficulty for the developer to determine exactly how individual macros in the source code were expanded during compilation or assembly simply by examining the source files and resulting object files.

There are currently also preprocessors available for some programming languages, which perform macro expansion, among other analyses. Again, the developer inputs the source files to the preprocessor. The preprocessor outputs a macro-expanded version of the source files, in which any macros are fully expanded without being translated to object code. In this case, the macros are present in the original version of the source files, but only the resulting replacement instructions are present in the macro-expanded version. Accordingly, it remains difficult for developer to determine which set of instructions in the macro-expanded version of the source files result from macro expansion of particular macros in the original source files. Further, it can be particularly difficult in the case of nested macro definitions to determine the effect of intermediate macros in a sequence of nested macro definitions.

Further, many compilers and static source code analysis tools report errors that occur during compilation or static analysis by line number of the program's source files. Any macros on this line of the source file, however, appear in their original form, prior to macro expansion. The developer therefore has a difficult time determining the set of instructions produced during macro expansion from the macros.

SUMMARY

Software development tools and techniques described herein provide for display of macro expansion information along with macros that appear in a software program. This makes macro expansion information more readily available to the developer. By viewing the macro along with its definition and expansion, the developer is then able to readily determine the set of instructions that will result from expansion of the macros, and thereby more easily locate and identify programming errors.

In one described example, a software development tool collects macro expansion information during a build of a software project, and records the macro expansion information in a data store (e.g., a database or file). The software development tool utilizes the recorded macro expansion information to provide a macro expansion display capability of a graphical user interface (GUI), such as a source code viewer or browser. This capability allows the GUI to display information as to the expansion of a macro in association with the respective macro, such as within a view of a portion of the source code containing the macro. In one particular variation of the macro expansion display capability, the GUI displays a textual listing of the source code containing a macro, and also includes text depicting the expansion of the macro in line with the macro in the source code listing. In other macro expansion display capability variations, the macro information associated with a macro in a source code listing can be displayed in a separate pane, panel, window, tool tip, hyper-linked view, or other display feature associated with the macro.

Additional features and advantages of the invention will be made apparent from the following detailed description of embodiments that proceeds with reference to the accompanying drawings.

BRIEF DESCRIPTION OF THE DRAWINGS

FIG. 2 is a listing of a macro expansion information record in a macro file produced by the macro processing and display tool of FIG. 1.

FIG. 3 is a view of a display provided by the graphical user interface of the macro processing and display tool of FIG. 1.

FIG. 4 is a view of a display provided by an alternative implementation of the graphical user interface with macro expansion display as a tool tip.

FIG. 5 is a view of a display provided by an alternative implementation of the graphical user interface with macro expansion display in a separate panel.

FIG. 6 is a view of a display provided by an alternative implementation of the graphical user interface with macro expansion display as a table.

DETAILED DESCRIPTION

The following description is directed to techniques and development tools for processing macro expansions and displaying the macro expansions associated with macros in a graphical user interface. The description presents an exemplary application of this technique in a static analysis tool and source code browser.

1. Macro Expansion Processing and Viewing Tool

Figure 1:
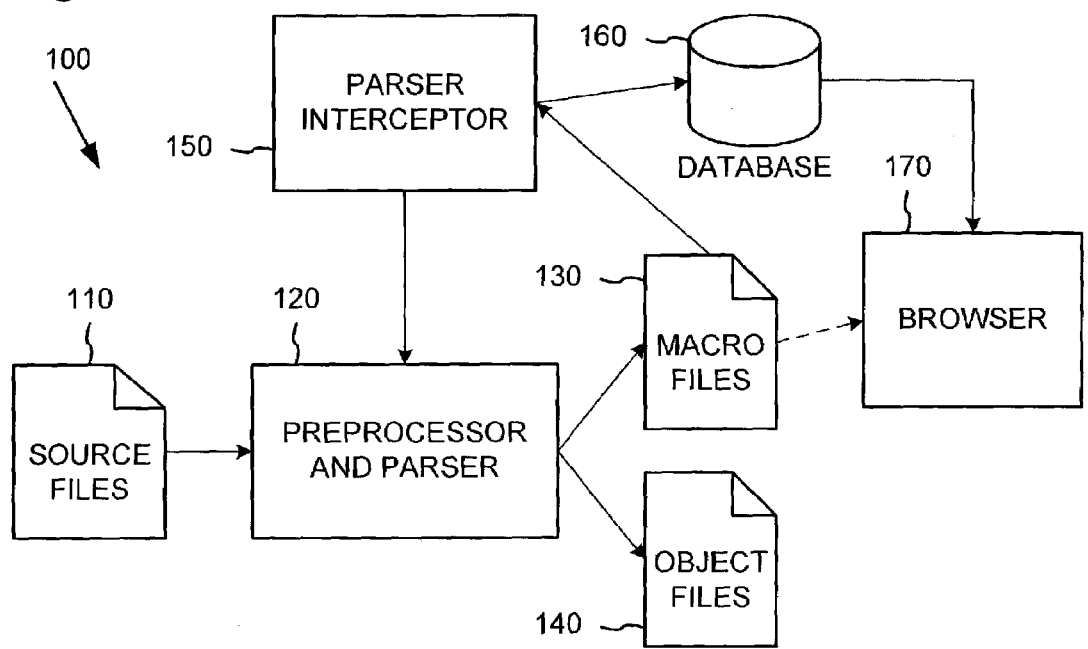
FIG. 1 is a data flow diagram of a macro processing and display tool that provides a graphical user interface with macro expansion display.

With reference to FIG. 1, a software development tool 100 provides a capability to produce information as to the expansions of macros in a set of source files for a program, and display macro expansion information along with the source file macros within a graphical user interface. In one implementation, the software development tool is a static analysis tool that performs various static analyses of source files to identify defects and displays defect warnings in a source browser. Alternatively, the software development tool 100 can take any of various forms or types of development tools, such as a source code browser, debugger, static analysis tool, or integrated development environment, among others.

In the implementation of the software development tool 100 illustrated in FIG. 1, the software development tool 100 first produces macro expansion information utilizing a preprocessor and parser 120 and parser interceptor 150 during a build of the program from a set of source files 110. The preprocessor and parser 120 and the parser interceptor 150 in this implementation are modified versions of conventionally known preprocessor, parser and parser interceptor found in static analysis tools and compilers. In particular, the preprocessor and parser 120 and parser interceptor 150 perform macro expansion of macros in the source files during the program build to produce the program's object code files 140. However, in addition to simply producing output object files in which macros within the source files are replaced with their expansions, the preprocessor and parser 150 also record macro expansion information to be used in providing a macro expansion display capability in a graphical user interface.

In a build of the program, the parser interceptor 150 invokes the preprocessor and parser 120 to process individual source files 110 according to instructions in a make file prepared by the developer. When invoked to process a source file, the preprocessor and parser 120 parses text of the source file into separate tokens using conventional lexical analysis techniques. The preprocessor and parser 120 further uses conventional syntax analysis techniques to identify macro definitions and macro statements in the source code. The preprocessor and parser 120 then applies the macro definitions in performing conventional macro expansion processing of macro statements, and outputting resulting instructions of expanded macros into object files. (See, e.g., Aho and Ullman, "Principles of Compiler Design," Addison-Wesley (1979).)

In addition to conventionally processing macro expansions and outputting the resulting expanded macro instructions to the object files 140, the preprocessor and parser 120 collects information of the macro definitions and expansions in some internal data structures of the preprocessor. At completion of parsing the source file, the preprocessor and parser 120 writes this collected information to a file. In this implementation, the files of macro expansion information are designated with a ".macro" file name extension. Later, upon the parser interceptor 150 completing invoking the preprocessor and parser for all the source files designated for processing in the make file, the parser interceptor 150 collects the information from the various ".macro" files and loads this information into a database 160. The parser interceptor 150 may be invoked many times during a build to process different of the source files of the program, and each such invocation will cause macro processing to occur.

The software development tool 100 further includes a source browser 170 with which the developer is able to view and browse through the text of the source files 110 of the program, and further view defect warnings produced from static analysis of the source files during the build. The source browser 170 provides a graphical user interface with controls that allow the developer to browse through views of the source files of the program. In displaying a view of a source file, the source browser 170 retrieves information as to the macro definition and expansion of a macro statement in the source file from the database 160. The source browser then displays the macro expansion information in association with the macro in the source file view as described more fully below.

2. Macro Expansion Information Record Format

With reference now to FIG. 2, the preprocessor and parser 120 (FIG. 1) collects information of a macro expansion into a macro expansion record, which is structured as defined in a "MacroInfo" data structure definition listing 200. The preprocessor and parser produces macro expansion records as macro expansions are performed during processing of a source file, and then outputs a sequence of the records for a particular source file into a counterpart ".macro" file.

As shown in this listing, the macro expansion record is structured in two sections, a section of macro definition details and another of macro expansion details. The macro definition details section includes a set of fields detailing the definition of the respective macro that was used in its macro expansion by the preprocessor and parser. The fields include character string fields containing the macro name, the macro definition, and the name and/or path of the source file containing the macro definition. The fields in the macro definition details section further include a line number on which the macro definition appears in its source file, and a length of the macro definition.

The macro expansion details section includes a set of fields detailing the resulting expansion of the macro by the preprocessor and parser. The macro expansion details section fields include character string fields containing the arguments to the macro, the resulting expansion, and the name of the source file containing the macro statement, as well as numeric fields containing the line number, column number and order in which the macro was expanded within a nested macro.

The following Table 1 more particularly describes the information contained in the various fields of the macro expansion structure 200.

TABLE 1

Macro Expansion Structure Fields

| Field Name | Description |
| --- | --- |
| macroName | Stores the name of the macro. |
| definition | Stores the definition of the macro. |
| defnFile | Stores the name of the file where the macro was defined. |
| defnLine | Stores the line number where the macro was defined. |
| formalCount | Stores the number of formal parameters the macro takes. |
| arguments | Stores all the arguments passed to the macro in a single string. This field will take the value NULL if formalCount's value is zero. |

TABLE 1-continued

Macro Expansion Structure Fields

| Field Name | Description |
|---|---|
| expansion | Stores the final expansion of the macro. |
| expnFile | Stores the name of the file the macro was used. |
| expnLine | Stores the line number where the macro was used. |
| expnColumn | Stores the column number where the macro was used. |
| expnOrder | The value of this field is used to get information about all the macros that are part of a nested macro. In case of nested macros, the macros get expanded in several steps. Each step processes one macro. Accordingly, there is an entry in the .macro file (also in the database table) for each such expansion. All the macros that belong to the same nested macro expansion have the same Expn_file, Line_no, and Column_no fields. The Expn_order field identifies the order in which the macros were processed. The top-level macro's Expn_order number is assigned as 1; the next macro to be processed has an Expn_order number of 2, and so on. The Expn_order field is not useful for non-nested macros. |

3. Database Table Format

As described above with reference to FIG. 1, the parser interceptor 150 collects the macro expansion information from the macro files 130 and loads macro expansion information from the above described macro expansion information records into the database 160 for later access by the source browser 170. The software development tool 100 stores the macro information in the database 160 to facilitate its retrieval by the source browser 170 for use in displaying macro expansion information within the source browser's graphical user interface (described more fully below). However, in alternative software development tool with macro expansion display capability, the source browser can retrieve macro expansion information directly from the macro files 130 as illustrated by the dotted line in FIG. 1.

In this implementation of the development tool 100, the database 160 contains two tables to store the information from the macro expansion information records, namely a macro definitions table and a macro expansions table. The macro definitions table is structured with the fields listed in the following Table 2.

TABLE 2

Macro Definitions Table

| Name | Datatype | Size | Primarykey |
|---|---|---|---|
| Id | int | 4 | Yes |
| Driver_runid | int | 4 | No |
| Macro_name | varchar | 100 | No |
| Defn_file | varchar | 300 | No |
| Line_no | int | 4 | No |
| Formal_count | int | 4 | No |
| Definition | varchar | 1000 | No |

In the macro definitions table, the Id field is the primary key of the macro definitions table, and stores a unique identifier to select a row of the table. The Driver_runid field identifies the build of the program in which the macro expansion information was generated. The Macro_name field stores the name of the macro. The Defn_file field stores the name of the source file in which the macro is defined. The Line_no field stores the line number within the source file where the macro's definition is found. The Formal_count field stores the number of formal parameters or arguments that the macro takes. The Definition field stores the text of the macro definition for the macro.

The macro expansions table is structured with the fields listed in the following Table 3.

TABLE 3

Macro Expansions Table

| Name | Datatype | Size | Primarykey |
|---|---|---|---|
| Id | int | 4 | Yes |
| Driver_runid | int | 4 | No |
| Expn_file | varchar | 300 | No |
| Line_no | int | 4 | No |
| Column_no | int | 4 | no |
| Expn_order | int | 4 | no |
| Arguments | varchar | 500 | No |
| Expansion | varchar | 1000 | No |
| Defn_id | int | 4 | No |

In the macro expansions table, the Id field is the primary key of the macro expansions table, and stores a unique identifier to select a row of the table.

The Driver_runid field identifies the build of the program in which the macro expansion information was generated.

The Expn_file field stores the name of the source file in which the macro statement that used the macro occurred. The Line_no field stores the line number of the macro statement within such source file. The Column_no field stores the column number where the macro was used in that macro statement.

The value of the Expn_order field is used to get information about all the macros that form part of a nested macro. The value of this field is used to get information about all the macros that are part of a nested macro. In case of nested macros, the macros get expanded in several steps. Each step processes one macro. Accordingly, there is an entry in the .macro file (also in the database table) for each such expansion. All the macros that belong to the same nested macro expansion have the same Expn_file, Line_no, and Column_no fields. The Expn_order field identifies the order in which the macros were processed. The top-level macro's Expn_order number is assigned as 1; the next macro to be processed has an Expn_order number of 2, and so on. The Expn_order field is not useful for non-nested macros. The Arguments field stores all the arguments passed to the macro as a single string.

The Expansion field stores the final expansion of the macro, i.e., the expanded instructions resulting from macro expansion of the macro.

The Defn_id field indicates the identifier for a record in the macro definitions table where information of the macro's definition is stored.

4. Source Browser GUI with Macro Expansion Display

Figure 3:
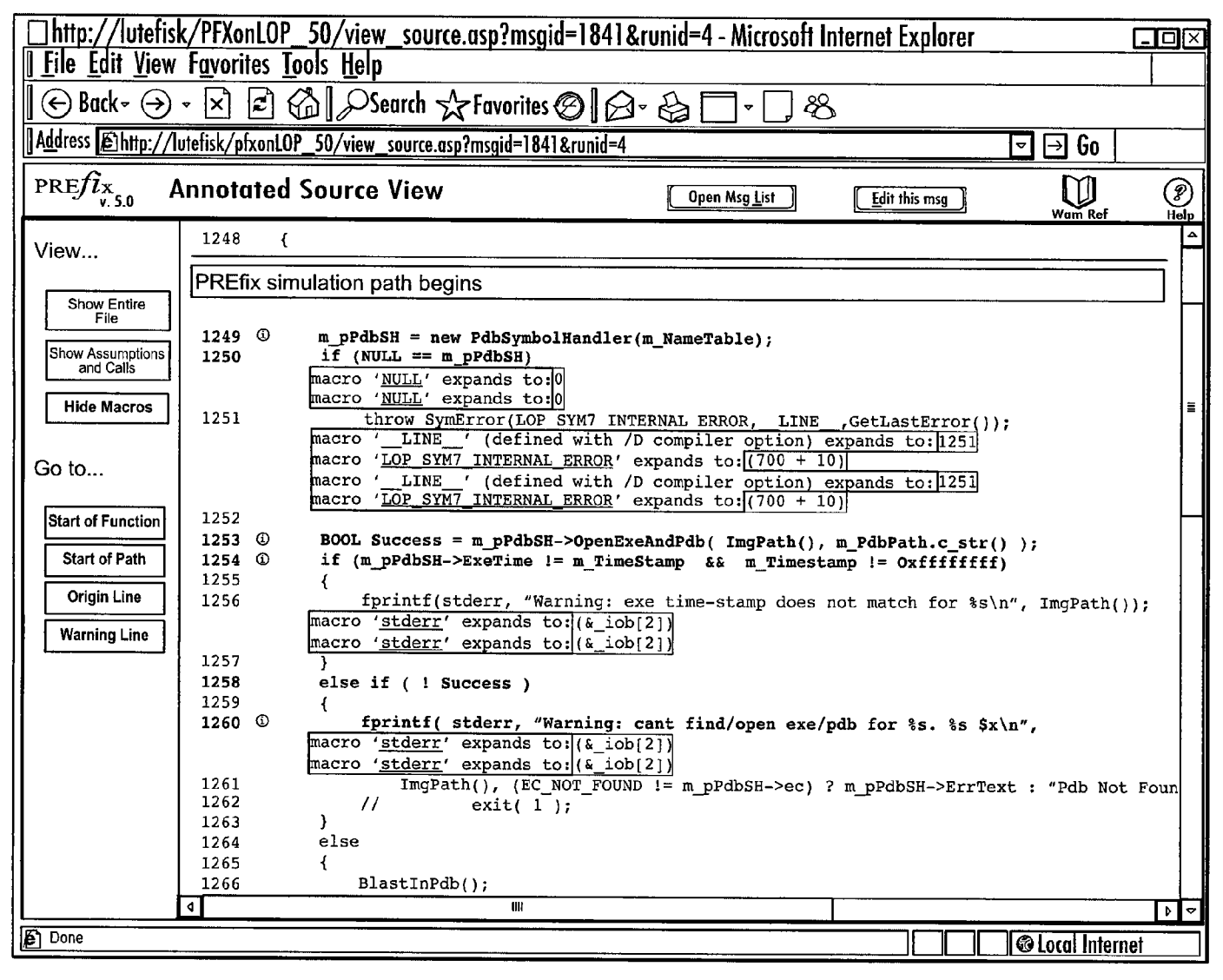

With reference now to FIG. 3, the source browser 170 (FIG. 1) presents a graphical user interface 300 with macro expansion display. For convenience of implementation, this graphical user interface is displayed using the active server page technology within an HTML (Hypertext Mark-up Language) browser window 300 (e.g., Microsoft Internet Explorer), but alternatively can be displayed in its own application window or otherwise.

The graphical user interface 300 includes a title bar 350, a panel 360 in which a view of a source file text is displayed, and a set of controls 370 for selecting viewing options and for navigation through the source file. One of these controls is a "Hide Macros" control 310 that turns on and off the display of macro expansion information in the source text viewing panel. When selected to display macro expansion information, the macro expansion information is shown in-line with macro statements in the source text shown in the source text viewing panel. More particularly, information describing the expansion of a macro is displayed directly beneath the macro statement containing the respective macro. For example, the macro expansion information 320 for the macro "NULL" appearing on source line 1250 is displayed directly beneath that source line in the source text shown in source text viewing panel, when the "Hide Macros" control 310 is selected not to hide macro expansion information. When the "Hide Macros" control 310 is selected to hide macro expansion information, the descriptions 320-323 of the expansions for macros in macro statements in the source text are not shown in the source text viewing panel.

In an alternative implementation depicted in FIG. 4, the graphical user interface provides the macro expansion display in the form of a tool tip, rather than in line in the source text view provided in the implementation depicted in FIG. 3. In this alternative implementation, the macro expansion information appears in a floating "tool tip" box 400, which is shown when the mouse pointer is placed to "hover" above a macro statement in the source text panel 360 (FIG. 3). The macro expansion information shown in this tool tip box is that for the macro statement pointed to by the mouse pointer.

In a further alternative implementation depicted in FIG. 5, the graphical user interface provides the macro expansion display within a separate macro expansion display pane 500 of the source browser's application window. This macro expansion display pane displays macro expansion information for a selected macro statement selected via a mouse click or other user input within the source text panel 360. The macro statement selection can be shown in the source text panel 360 by a selection highlight 510 or like graphical indication. In another variation, the macro name in the macro statement in the source text display panel presents a hyperlink to a separate window, which upon activation of the hyperlink (e.g., by mouse click on the macro name hyper link) displays the macro expansion information in the separate window.

In yet another alternative implementation depicted in FIG. 6, the graphical user interface provides the macro expansion display in the form of a table 600. The table 600 lists the macros and their expansions for the source file. The graphical user interface in this implementation optionally may include a display of the source text, but also may show only the table 600 of macro expansions for the program's source.

As can be seen from these several depicted implementations, the graphical user interface with macro expansion display can present the macro expansions for a source text in a variety of different ways. Accordingly, it will be appreciated that other implementations of the development tool can provide still other variations of the macro expansion information presented along with or associated with a macro statement of the program's source file within a graphical user interface.

In some implementations, the graphical user interface of the development tool 100 can display the various macro expansions for a nested macro, or alternatively may display only the nested macro's final resulting macro expansion.

5. Computing Environment

The above described software development tool 100 (FIG. 1) and macro processing and display techniques can be implemented on any of a variety of computing devices and environments, including computers of various form factors (personal, workstation, server, handheld, laptop, tablet, or other mobile), distributed computing networks, and Web services, as a few general examples. The graphical user interface with macro expansion display can be implemented in hardware circuitry, as well as in macro processing and viewing software 780 executing within a computer or other computing environment, such as shown in FIG. 7.

Figure 7:
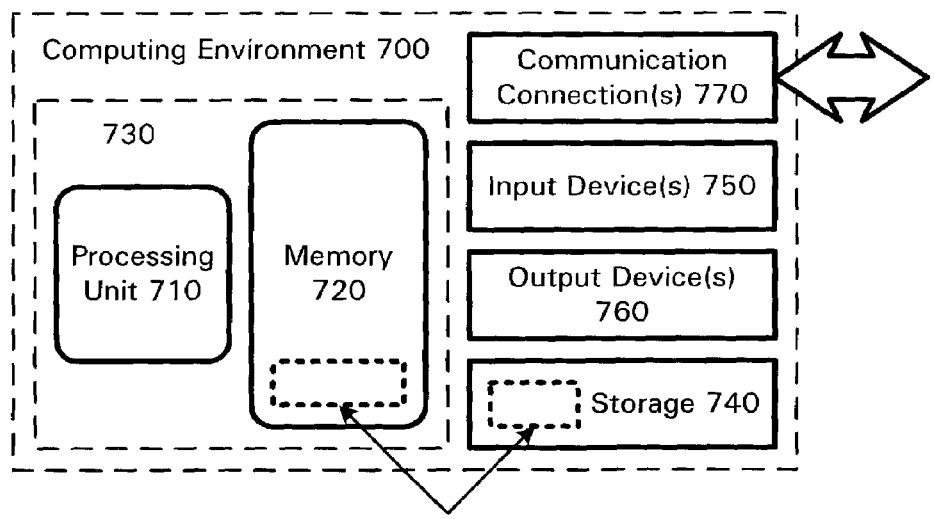
FIG. 7 is a block diagram of a suitable computing environment for implementing the macro processing and display tool of FIG. 1.

FIG. 7 illustrates a generalized example of a suitable computing environment 700 in which the described techniques can be implemented. The computing environment 700 is not intended to suggest any limitation as to scope of use or functionality of the invention, as the present invention may be implemented in diverse general-purpose or special-purpose computing environments.

With reference to FIG. 7, the computing environment 700 includes at least one processing unit 710 and memory 720. In FIG. 7, this most basic configuration 730 is included within a dashed line. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory, etc.), or some combination of the two. The memory 720 stores software 780 implementing the software development tool 100 with macro expansion processing and display.

A computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other medium which can be used to store information and which can be accessed within the computing environment 700. The storage 740 stores instructions for the device connectivity and networking software 780.

The input device(s) 750 (e.g., for devices operating as a control point in the device connectivity architecture 100) may be a touch input device such as a keyboard, mouse, pen, or trackball, a voice input device, a scanning device, or another device that provides input to the computing environment 700. For audio, the input device(s) 750 may be a sound card or similar device that accepts audio input in analog or digital form, or a CD-ROM reader that provides audio samples to the computing environment. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The macro expansion processing and display techniques herein can be described in the general context of computer-readable media. Computer-readable media are any available media that can be accessed within a computing environment. By way of example, and not limitation, with the computing environment 700, computer-readable media include memory 720, storage 740, communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A method of providing macro expansions display in a software development tool, the method comprising:
   parsing a set of source files of a programming project, the set of source files having at least one macro;
   performing macro expansion of any macros appearing in the source files;
   for each source file, collecting information descriptive of the macro expansions of the macros;
   recording the collected information into separate macro files for each source file;
   loading the separate macro files into a database such that the macro expansion record information is stored in at least two macro-specific tables, the at least two macro-specific tables comprising: a macro definition table and a macro expansion table;
   wherein the macro definition table comprises records corresponding to macros,
   a record corresponding to a given macro comprising:
      a macro id uniquely identifying the given macro, and
      a definition of the given macro;
   wherein the macro expansion table comprises at least one record corresponding to a macro statement within the source files, the at least one record corresponding to a macro statement comprising:
      a name field storing name of the source file from which the macro statement using the given macro occurred,
      a line number field storing line number of the macro statement within the source file,
      a column number field storing column number where the given macro was used in the macro statement,
      if the macro statement is nested, macro expansion information comprising nesting order of the given macro within the macro statement,
      the ID identifying the given macro record in the macro definition table, and
      wherein there is a separate record in the macro expansion table for each expansion of a nested macro;
   providing a graphical user interface on a display device;
   retrieving information of a respective macro expansion for a macro appearing in the source files of the programming project from the database; and
   within the graphical user interface, presenting a display of the retrieved information of the macro expansion in-line within the source code directly below an occurrence of the macro statement in source code corresponding to the source files.

2. The method of claim 1, further comprising:
   receiving user selection input for an option setting controlling display of the macro expansion information via an option selection control in the graphical user interface, the option setting including a state to show macro expansion information and a state to hide macro expansion information;
   showing the display of the macro expansion information within the graphical user interface when the option setting is in the show macro expansion information state; and
   removing the display of the macro expansion information within the graphical user interface when the option setting is in the hide macro expansion information state.

3. The method of claim 1, further comprising:
   presenting the display of the retrieved information of the macro expansion of a respective macro upon user selection of the macro.

4. The method of claim 3, further comprising:
   presenting the display of the retrieved information of the macro expansion of the respective macro in a tool tip box.

5. The method of claim 3, further comprising:
   presenting the display of the retrieved information of the macro expansion of the respective macro in a panel area of the graphical user interface.

6. The method of claim 1, further comprising:
   presenting the display of the retrieved information of the macro expansion as a table in the graphical user interface.

7. The method of claim 1, wherein the retrieved information of the macro expansion for a macro includes a definition of the macro and an expansion of the macro.

8. The method of claim 1, wherein the retrieved information of the macro expansion for a macro includes an order of the macro expansion in a sequence of macro expansions in case of a nested macro.

9. A computer-readable program carrying storage medium having programming for a software development tool carried thereon, the software development tool comprising:
   a preprocessor for processing macro expansions of statements in source code files with source code, the source code with macros, and outputting information descriptive of the macro expansions to one or more dedicated macro files;
   a parser interceptor for collecting the one or more dedicated macro files and loading the information descriptive of the macro expansions into dedicated tables in a database, the dedicated tables comprising a macro definition table and a macro expansion table;
   wherein the macro definition table comprises:
      a field identifying name of a source file in which a given macro is defined, and
      a field storing text of a macro definition for the given macro;
   wherein the macro expansion table comprises:
      an expansion field storing source file for a given macro statement that uses the given macro, a line number field storing line number of the given macro statement in the source file, a column number field storing column number of the given macro within the given macro statement, a macro expansion field that identifies order in which the given macro is processed, if the given macro statement is part of a nested macro, wherein macros that belong to a given nested macro statement have equal values in their expansion field, equal values in their line number field, and equal values in their column number field; and a graphical user interface for reading the macro information from the database and presenting an in-line display of the macro expansions of the macros directly below a display of the source code with the respective macros.

* * * * *